US010616337B1

(12) United States Patent
Satyanarayana (10) Patent No.: US 10,616,337 B1
(45) Date of Patent: Apr. 7, 2020

(54) GRAPHICAL USER INTERFACE (GUI) THAT FACILITATES DATABASE MIGRATION

(71) Applicant: Allscripts Software, LLC, Raleigh, NC (US)

(72) Inventor: Raghavendra Manavalli Satyanarayana, Karnataka (IN)

(73) Assignee: ALLSCRIPTS SOFTWARE, LLC, Raleigh, NC (US)

( * ) Notice: Subject to any disclaimer, the term of this patent is extended or adjusted under 35 U.S.C. 154(b) by 104 days.

(21) Appl. No.: 15/407,973

(22) Filed: Jan. 17, 2017

(51) Int. Cl.
*G06F 15/16* (2006.01)
*H04L 29/08* (2006.01)
*H04L 12/24* (2006.01)

(52) U.S. Cl.
CPC .......... *H04L 67/1097* (2013.01); *H04L 41/22* (2013.01); *H04L 67/06* (2013.01)

(58) Field of Classification Search
CPC ...... H04L 67/1097; H04L 41/22; H04L 67/06
USPC ........................................................ 709/223
See application file for complete search history.

(56) References Cited

U.S. PATENT DOCUMENTS

| | | | | |
|---|---|---|---|---|
| 6,484,177 B1* | 11/2002 | Van Huben | ........... | G06F 16/282 |
| 6,996,589 B1* | 2/2006 | Jayaram | ............... | G06F 16/258 |
| 2002/0178233 A1* | 11/2002 | Mastrianni | ............... | G06F 8/60 |
| | | | | 709/217 |
| 2003/0195765 A1* | 10/2003 | Sehgal | ..................... | G06F 16/25 |
| | | | | 705/1.1 |
| 2004/0093344 A1* | 5/2004 | Berger | ............. | G06F 17/30557 |
| 2007/0127426 A1* | 6/2007 | Watters | ................ | H04L 67/125 |
| | | | | 370/338 |
| 2010/0239523 A1* | 9/2010 | Watkins | ............... | A61K 31/485 |
| | | | | 424/85.2 |
| 2012/0239540 A1* | 9/2012 | Rogers, Jr. | ............. | G06F 17/21 |
| | | | | 705/35 |
| 2013/0058340 A1* | 3/2013 | Lambeth | ............. | H04L 12/4633 |
| | | | | 370/392 |

* cited by examiner

*Primary Examiner* — Sm A Rahman
(74) *Attorney, Agent, or Firm* — Medley, Behrens & Lewis, LLC (57) ABSTRACT

Described herein are features pertaining to displaying a graphical user interface (GUI) that depicts mappings between entities of a source database and entities of a destination database. A database migrator is able to interact with the GUI to approve preliminary mappings as well as to modify preliminary mappings. Once the database migrator approves the mappings, scripts can be generated, wherein the scripts are usable to migrate data from the source database to the destination database.

20 Claims, 9 Drawing Sheets

GRAPHICAL USER INTERFACE (GUI) THAT FACILITATES DATABASE MIGRATION

BACKGROUND

Generally, migration of data from a source database to a destination database requires users to manually generate scripts, wherein the scripts, when executed over the source database, direct data to appropriate locations in the destination database. Manually generating scripts, however, is a time-consuming task. In an example, an application can be configured to store data into and retrieve data from a source database, wherein the source database conforms to a source database schema. The application may be updated (i.e., to create a new version of the application), where the update to the application includes creation of a new (destination) database that conforms to a new database schema. To effectively update the application to the new version, then, data from the source database needs to be migrated to the destination database. As indicated above, however, generating scripts to perform such migration can be tedious and time consuming, and for complex applications can take several months (or even years).

SUMMARY

The following is a brief summary of subject matter that is described in greater detail herein. This summary is not intended to be limiting as to the scope of the claims.

Described herein are features pertaining to generating database migration scripts based upon mappings, wherein the mappings indicate how entities from a source database relate to entities in a destination database (e.g., where data from the source database is to be stored in the destination database). The entities include tables, fields of tables, or constraints on data of the databases. More particularly, a graphical user interface (GUI) displays the mappings, and the mappings can be modified based upon input to the GUI. For example, a modification can be an indication that data from a table from the source database is to migrate to a table in the destination database, data in tables from the source database is to be transformed prior to migrating to the destination database, etc. Further, the scripts are generated based upon the mappings (and modifications therein). Execution of the scripts results in the destination database being populated with data based upon the above-mentioned mappings.

The system described herein receives schemas of a source database and destination database. Responsive to the receiving the schemas, system identifies preliminary mappings between the source database schema and the destination database schema, and further causes a subset of these preliminary mappings to be displayed on a GUI, wherein the preliminary mappings indicate estimates as to how the entities defined in the source database schema are mapped to entities defined in the destination database schema. The GUI is also configured to receive input from a user (e.g., database migrator), wherein the input can cause different mappings to be presented (corresponding to different portions of the schemas) and/or can cause a mapping to be modified (including the preliminary mappings). Exemplary modifications to mappings include additions, removals, or changes to the mappings between entities defined in the database schemas. For example, a modification can be an addition of a mapping to the preliminary mappings. In another example, the modification can be a change to a mapping that causes data (from a table in the source database) to be transformed while being migrated (to a table in the destination database). The GUI is updated to depict the updating of the mappings as the modifications to the mappings are made. Additionally, once the user has defined the mappings (e.g., approved the preliminary mappings and made appropriate modifications), the system, based upon the mappings, can generate scripts that, when executed over the source database, cause data in the source database to be migrated to the destination database. Therefore, for example, the GUI presents a mechanism that allows a database migrator to quickly visualize (and define) mappings between entities defined in the source database schema and the destination database schema, and subsequently scripts are automatically constructed in accordance with the mappings.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to a system that displays a graphical user interface (GUI) that depicts mappings between entities of a source database and entities of a destination database, facilitates modifications to the mappings, and generates database migration scripts based upon the mappings are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Further, as used herein, the term "exemplary" is intended to mean serving as an illustration or example of something, and is not intended to indicate a preference.

Further, as used herein, the terms "component" and "system" are intended to encompass instructions stored in computer-readable data storage that are configured to cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are features pertaining to generating database migration scripts based upon mappings, wherein the mappings indicate how entities from a source database relate to entities in a destination database (e.g., where data from the source database is to be migrated to the destination database). The entities include tables, fields of tables, or constraints on data of the databases. More particularly, a graphical user interface (GUI) displays the mappings, and the mappings can be modified based upon input of a user (e.g., database migrator) by way of the GUI. For example, a modification can be an indication that data from a first table of the source database is to migrate to a second table of the destination database, data from tables in the source database is to be transformed prior to migrating to the destination database, etc. Further, the scripts are generated based upon mappings that are approved by the database migrator. The scripts are executed when data is migrated from the source database to the destination database, wherein execution of the scripts over the source database results in data being migrated to the destination database.

Summarily, the system described herein receives schemas of a source database and destination database, wherein the schemas define the architectures of the source database and destination database. Responsive to receiving the schemas, the system generates preliminary mappings between elements defined in the source database schema and elements defined in the destination database schema. Due to differences in structures of the source and destination database, different naming conventions used when generating the schemas, etc., however, the preliminary mappings may not completely or accurately map the entities defined in the source database schema to the entities defined in the destination database schema. More particularly, the preliminary mappings may have a missing mapping (e.g., a table identified in the source database schema may not be mapped to a corresponding table in the destination database schema, a field of a table identified in the source database schema may not be mapped to a corresponding table defined in the destination database scheme, etc.) or an incorrect mapping. The system additionally generates a GUI that allows a user (e.g., database migrator) to navigate through a graphical representation of the mappings of the source database to the destination database, and manually define such mappings.

The GUI can receive input from the user that modifies the preliminary mappings based upon the input. The modifications include additions or changes to the mappings that graphically depict how data is to be migrated from the source database to the destination database. For example, a modification can be the addition of a mapping to the preliminary mappings (e.g., where the system failed to include the mapping in the preliminary mappings). In another example, the modification can be a change to a mapping in the mappings that causes data (from a table in the source database) to be transformed prior to the data being migrated (to a table in the destination database).

Generally, the features described herein are well-suited for when an update to an application has occurred, wherein the update may include an update to an underlying database. For instance, when an application is updated, a new database schema can be defined to allow for one or more new features of the application to be enabled. Oftentimes, the new schema may be somewhat similar to the existing schema, as a developer may leverage an existing data structure when developing the update to the application. Moreover, the updated application may still be configured to consume some of the data in the "old" database that conforms to the "old" schema. In these situations, database migrators are tasked with migrating data from the "old" database that conforms to the "old" schema into the "new" database that conforms to the "new" schema. As noted above, conventionally, migrating desired data from the "old" database into the "new" database is labor-intensive and time-consuming, as the migrator must understand both schemas and then manually generate scripts that cause the data from the "old" database to be migrated to the "new" database. Described herein is a graphical approach that assists a database migrator with creating these scripts much more quickly than compared to the time required using the conventional approach.

Figure 1:
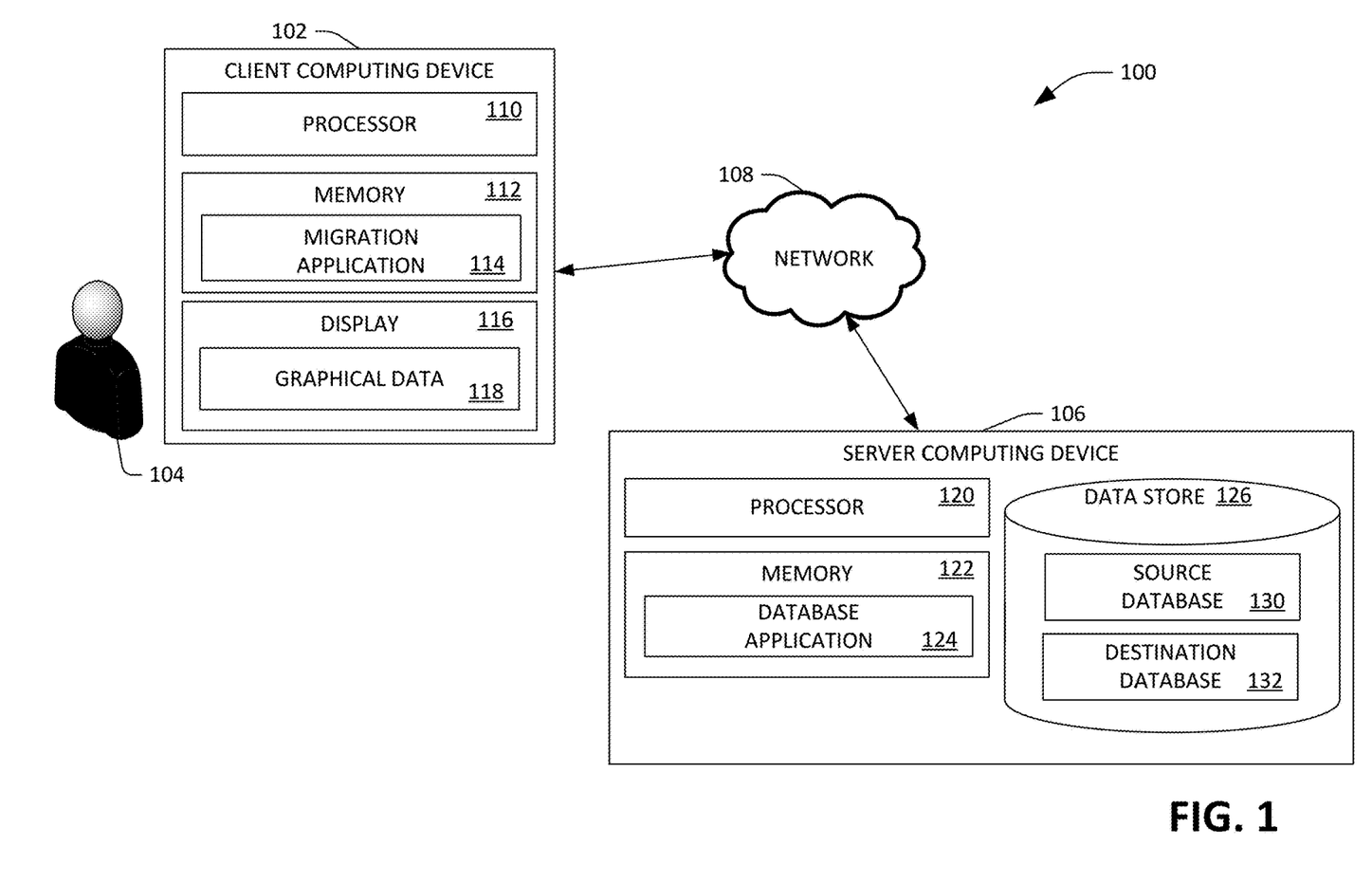
FIG. 1 is a functional block diagram of an exemplary system that facilitates generating scripts for migrating data from a source database to a destination database.

With reference now to FIG. 1, an exemplary system 100 that facilitates generating scripts for migrating data from a source database to a destination database is illustrated. The scripts can be in a database management system language (e.g., Structured Query Language (SQL)) that can be executed by a computing device, wherein executing the scripts causes data from the source database to be migrated to the destination database. The system 100 includes a client computing device 102 that is operated by a database migrator 104 (who also may be referred to as database manager, a database engineer, etc.). The client computing device 102 operated by the database migrator 104 may be any suitable type of client computing device, including a desktop computing device, a laptop computing device, a mobile telephone, a tablet computing device, a wearable computing device, or the like. The system 100 further includes a server computing device 106 that is in communication with the client computing device 102 by way of a suitable network 108, such as the Internet, an intranet, or the like. While the client computing device 102 is depicted as being in communication with the server computing device 106 by way of the network 108, it is to be understood that the client computing device 102 may be in communication with the server computing device 106 over different networks.

The client computing device 102 includes a processor 110 and memory 112. The memory 112 stores instructions that are executed by the processor 110. More specifically, the memory 112 includes a migration application 114. As will be described in greater detail herein, the migration application 114 is configured to generate preliminary mappings between database entities defined in a source database schema and corresponding database entities defined in a target database schema. The migration application 114 is further configured to modify (update) the mappings based upon input to a GUI from the database migrator 104. The database entities include tables, fields of the tables, or data that is stored in the fields. The client computing device 102 further comprises a display 116, which is configured to present graphical data 118 (including the GUI) to the database migrator 104. The graphical data 118 may include the mappings of entities in the source database schema to entities in the destination database schema presented by way of the migration application 114. While the display 116 is depicted as being integral to the client computing device 102, it is to be understood that the display 116 may be externally coupled to the client computing device 102 or may be a projected display.

The server computing device 106 includes a processor 120 and memory 122 that stores instructions that are executed by the processor 120. As shown in FIG. 1, the memory 122 includes a database application 124. The database application 124 can be configured to manage data according to database schemas (not shown). The server computing device 106 further includes a data store 126, wherein the data store 126 includes a source database 130, wherein the source database 130 comprises data that is stored according to a source database schema (not shown). More particularly, the source database schema defines how data in the source database is organized (e.g., what tables are in the source database, naming conventions, which tables point to other tables, etc.) The data store 126 also includes a destination database 132, wherein the destination database 132 comprises data that is stored according to a destination database schema (not shown). The destination database schema, similar to the source database schema, defines how data in the destination database is organized. The destination database schema may, however, be non-identical to the source database schema, as referenced above.

Operation of the migration application 114 is now described. The migration application 114 can receive input from the database migrator 104. For instance, the display 116 can present a GUI for the migration application 114, and the migration application 114 can receive input from the database migrator 104 by way of the GUI. As will be shown and described in greater detail herein, the migration application 114 can cause the GUI to display preliminary mappings between entities defined in the source database schema and corresponding entities defined in the destination database schema, wherein the migration application constructs the preliminary mappings based upon comparisons undertaken between the source database schema and the destination database schema, as will be described in greater detail below. Further, the migration application 114 can facilitate modifications to the preliminary mappings based upon input of the database migrator 104 to the GUI. The modifications can comprise changes that reflect how the database migrator 104 wants entities to be mapped between the source database 130 and the destination database 132 (e.g., adding additional mappings, removing incorrect mappings, etc.). Additionally, the migration application 114, based upon the mappings (and modifications therein), can generate scripts that facilitate migration of data from the source database 130 to the destination database 132. More particularly, the scripts, when executed by an application that migrates database data (e.g., the database application 124), cause data from the source database 130 to migrate to the destination database 132 according to the mappings.

Figure 2:
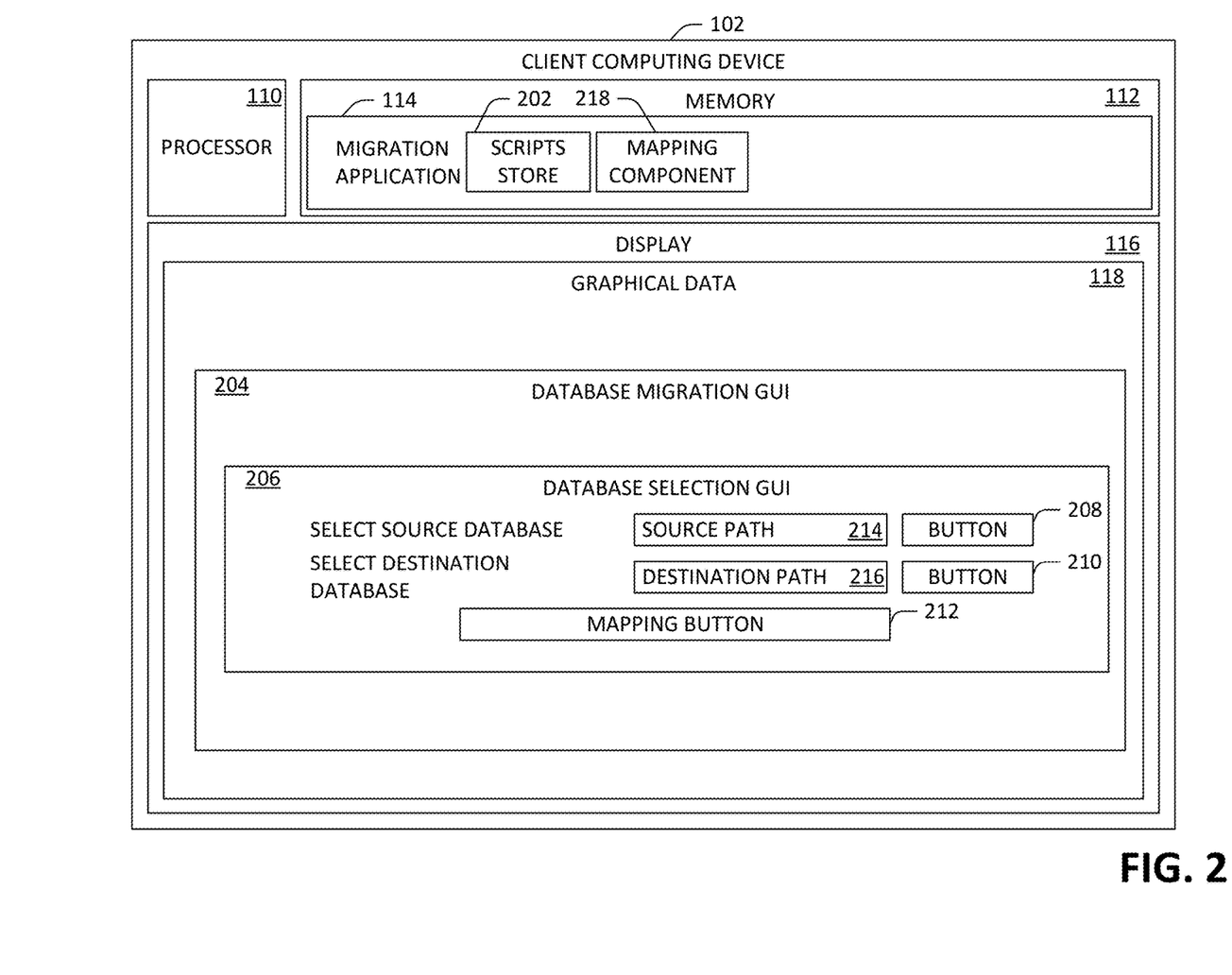
FIG. 2 depicts an exemplary client computing device.

With reference now to FIG. 2, a functional block diagram of the client computing device 102 is illustrated. As indicated previously, the migration application 114 is loaded in the memory 112 and is executed by the processor 110. The migration application 114 has a scripts store 202, where the scripts store 202 comprises scripts generated by the migration application 114. As stated above, the scripts, when executed by an application that migrates database data, causes data to be migrated from the source database 130 to the designation database 132. As indicated previously, scripts in the scripts store 202 are generated based upon mappings approved by the database migrator 104. The processor 110, when executing the migration application 114, causes a database migration GUI 204 to be included in the graphical data 118 on the display 116. In this example, the database migration GUI 204 comprises a database selection GUI 206 that can be presented when the migration application 114 is launched or upon receipt of a request from the database migrator 104. The database selection GUI 206 includes a first button 208, a second button 210, and a preliminary mapping button 212. The first button 208 when selected by the database designer 104 (e.g., by way of a mouse pointer, voice command, interaction with a touch sensitive display, etc.), is configured to allow the database migrator 104 to enter or select a source path 214 for the source database 130. The source path 214 for the source database 130 can be a filepath that points to the source database schema on the server computing device 106. The second button 210, when selected by the database migrator 104 (e.g., by way of a mouse pointer, voice command, interaction with a touch sensitive display, etc.), is configured to allow the database migrator 104 to enter or select a destination path 216 for the destination database 132. The destination path 216 for the destination database 132 can be a filepath that points to the destination database schema at the server computing device 106. The preliminary mapping button 212, when selected by the database migrator 104, is configured to cause the processor 110 to execute a mapping component 218 of the migration application 114. The mapping component 218 is configured to: 1) accept the source path 214 and the destination path 216 as arguments; 2) generate preliminary mappings between entities defined in the source database schema (addressed by the source path 214) to corresponding entities defined in the destination database schema (addressed by the destination path 216), wherein the preliminary mappings are generated based upon a set of algorithms that will be described in greater detail below; and 3) present, in a GUI, at least a subset of the preliminary mappings between the entities defined in the source database schema and entities defined in the destination database schema. Further, and as will be described in greater detail herein, the mapping component 218 is configured to facilitate, based upon input to the database migration GUI 204, navigation of the mappings and modifications to the mappings.

As noted previously, the mapping component 218 is configured to generate the preliminary mappings between the entities of the source database 130 and the destination database 132 (as defined in the schemas). For example, the entities can include tables, fields, records, etc. More particularly, the mapping component 218 can determine whether a first table defined in the source database schema is to be preliminarily mapped to a second table defined in the destination database schema, wherein the mapping component 218 can make such determination through use of a title matching algorithm. Generally, the title matching algorithm indicates that the first table is to be preliminarily mapped to the second table when titles of the two tables correspond to one another. More specifically, and in an example, the mapping component 218 can preliminarily map the first table to the second table when the titles of the tables are exact matches (e.g., "Patient" and "Patient"). In another example, the mapping component 218 can preliminarily map the first table to the second table when the titles are exact matches once special characters (e.g., "!", "_", etc.) are removed from the titles. Thus, when the title of the first table is "Patient Address" and the title of the second table is "PatientAddress", the mapping component 218 removes the special character "_" from the first table to create a modified title for the first table, and compares the modified title for the first table ("PatientAddress") with the title for the second table "PatientAddress". It can be ascertained that these titles match; accordingly, the mapping component 218 can generate a preliminary mapping between the first table and the second table. In yet another example, the mapping component 218 can consider phonetics when determining whether the first table is to be mapped to the second table. Thus, in an example, when the title of the first table is "hsptl", and the title of the second table is "hospital", the mapping component 218 can map the first table to the second table based upon the table titles being phonetically similar (e.g., up to some threshold level of similarity). For instance, the mapping component 218 can attempt to map each table defined in the source database schema to a corresponding table in the destination database schema, although instances will occur where the mapping component 218 will be unable to identify suitable mappings between some tables defined in the source database schema and some tables defined the target database schema.

Subsequent to generating the preliminary mappings between the tables defined in the source database schema and the tables defined in the destination database schema, the mapping component 218 is configured to generate, for instance, mappings between fields of each mapped table. Continuing with the example set forth above, the mapping component 218 can generate a preliminary mapping between the first table and the second table, wherein the source database schema indicates that the first table comprises a first field, and the destination database schema indicates that the second table comprises a second field. The mapping component 218, then, can generate a preliminary mapping between the first field and the second field utilizing an approach similar to that described above with respect to generating the preliminary mapping between the first table and the second table. Therefore, for instance, when the first field is titled "PatientID" and the second field is titled "PatientID", the mapping component 218 can generate a preliminary mapping between the first field and the second field, due to the exact match. In another example, when the first field is titled "Patient_ID" and the second field is titled "Patient$ID", the mapping component 218 can generate a preliminary mapping between the first field and the second field, due to the titles matching once special characters are removed. Further, the mapping component 218 can generate a preliminary mapping between the first field and the second field when there is a phonetic match or sufficient similarity between phonetics of the field titles. The mapping component 218 can repeat this process for each field in tables that have already been preliminary mapped by the mapping component 218.

Responsive to the mapping component 218 preliminarily mapping the entities of the source database 130 to the entities of the destination database 132 on the table-to-table level and field-to-field level, the mapping component 218 presents in the graphical data 118 of the display 116 a depiction of the preliminary mappings. Additionally, as will be described in greater detail herein, the preliminary mappings can be modified responsive to input by the database migrator 104. Once the database migrator 104 has indicated that the mappings are finalized, the mapping component 218 can generate scripts based upon the mappings. More particularly, the scripts (when executed by an application that causes data to be migrated from the source database 130 to the destination database 132) causes the data to be migrated based upon the mappings.

Figure 3:
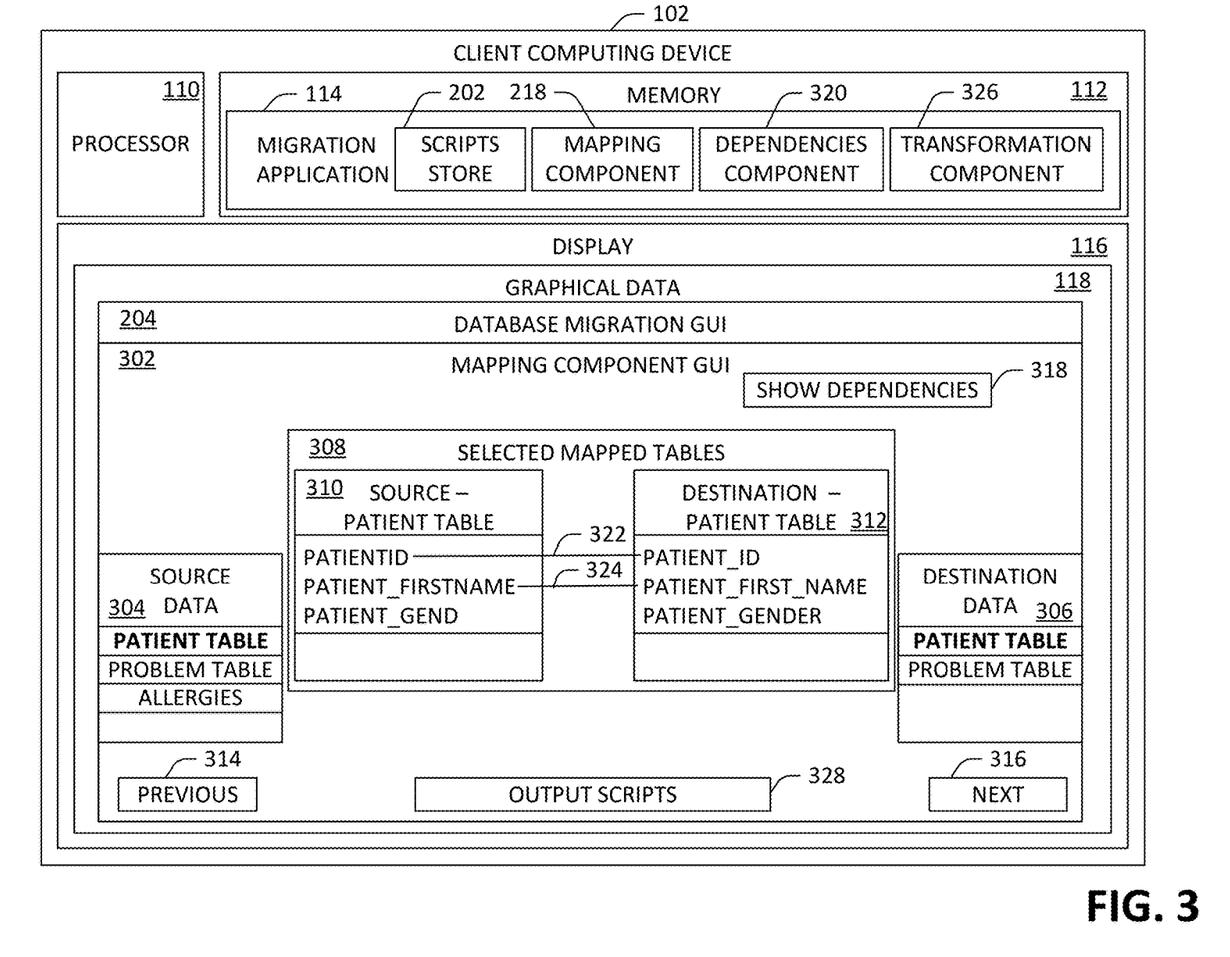
FIG. 3 is an exemplary graphical user interface of a database migration application.

Turning now to FIG. 3, a depiction of the graphical data 118 while a mapping component GUI 302 is being presented on the display 116 is illustrated. The processor 110, when executing the migration application 114, causes the mapping component GUI 302 to be included in the graphical data 118 on the display 116 responsive to the mapping component 218 generating the preliminary mappings. The mapping component GUI 302 includes a source database pane 304, where the source database pane 304 includes a list of tables from the source database 130, wherein the tables in the list of tables are not dependent tables. Further, the mapping component GUI 302 includes a destination database pane 306, where the destination database pane 306 includes a list of tables from the destination database 132, wherein the tales in the list of tables are not dependent tables.

The mapping component GUI 302 is configured to display a selected mapped tables pane 308 that comprises a source window 310 and a destination window 312. The source window 310 depicts a title of a first table and its fields as identified in the source database schema, and the destination window 312 depicts a title of a second table and its fields as identified in the destination database schema, wherein the mapping component 218 has generated a preliminary mapping between the first table and the second table. For example, in the illustration provided, the mapping component 218 has generated a preliminary mapping between a "PATIENT TABLE" table from the source database 130 and a "PATIENT TABLE" table from the destination database 132. The "PATIENT TABLE" table identified in the source window 310 includes a list of fields in the "PATIENT TABLE" table of the source database: "PATIENTID", "PATIENT_FIRSTNAME", and "PATIENT_GEND". The "PATIENT TABLE" table identified in the destination window 312 includes a list of fields in the "PATIENT TABLE" table of the destination database 132: "PATIENT_ID", "PATIENT_FIRST_NAME", and "PATIENT_GENDER".

Additionally, the mapping component GUI 302 includes a "previous" button 314 and a "next" button 316. The "previous" button 314 and the "next" button 316, when selected by the database migrator 104, causes different tables to be depicted in the selected mapped tables pane 308. In other words, selecting the "next" button 316 causes the source window 310 and the destination window 312 to include identifiers for the "PROBLEM TABLE" depicted in the pane 304 and the "PROBLEM TABLE" depicted in the pane 306, respectively, wherein the mapping component 218 has preliminarily mapped such tables to one another. Additionally, the source window 310 and the destination window 312 depicts the fields of such tables.

The mapping component GUI 302 further allows the database migrator 104 to select a table (and a table mapped to the selected table) from either the source database pane 304 or the destination database pane 306. For example, the database migrator 104 can select the "PROBLEM TABLE"

in the source database pane 304. Responsive to the database migrator 104 selecting the "PROBLEM TABLE" from the source database pane 304, content of the selected map tables pane 308 is updated such that the source window 310 depicts an identifier for the "PROBLEM TABLE" and its fields from the source database 130, and the destination window 312 depicts an identifier for the "PROBLEM TABLE" and its fields from the destination database 132.

The mapping component GUI 302 additionally includes a show dependencies button 318. A dependencies component 320 of the migration application 114 identifies dependencies of tables in the source database 130 and the destination database 132. When the show dependencies button 318 is selected by the database migrator 104, tables identified by the dependencies component 320 as being dependent upon at least one of the tables represented in the pane 308 are depicted. In other words, the dependencies comprise tables in the source database 130 and/or the destination database 132 that are respectively dependent upon at least one of the tables represented in the selected mapped tables pane 308. A first table is dependent upon a second table if existence of records in the first table is conditioned upon the existence of records in the second table. Thus, when the show dependencies button 318 is selected, the database migration GUI 204 is updated to depict tables from the source database 130 that are dependent upon the table represented in the source window 310, and the database migration GUI 204 is further optionally updated to depict tables from the destination database that are dependent upon the table represented in the destination window 312. The database migrator 104 can then select any of the dependent tables, which can cause the selected table to be represented in the selected mapped tables pane 308.

Figure 4:
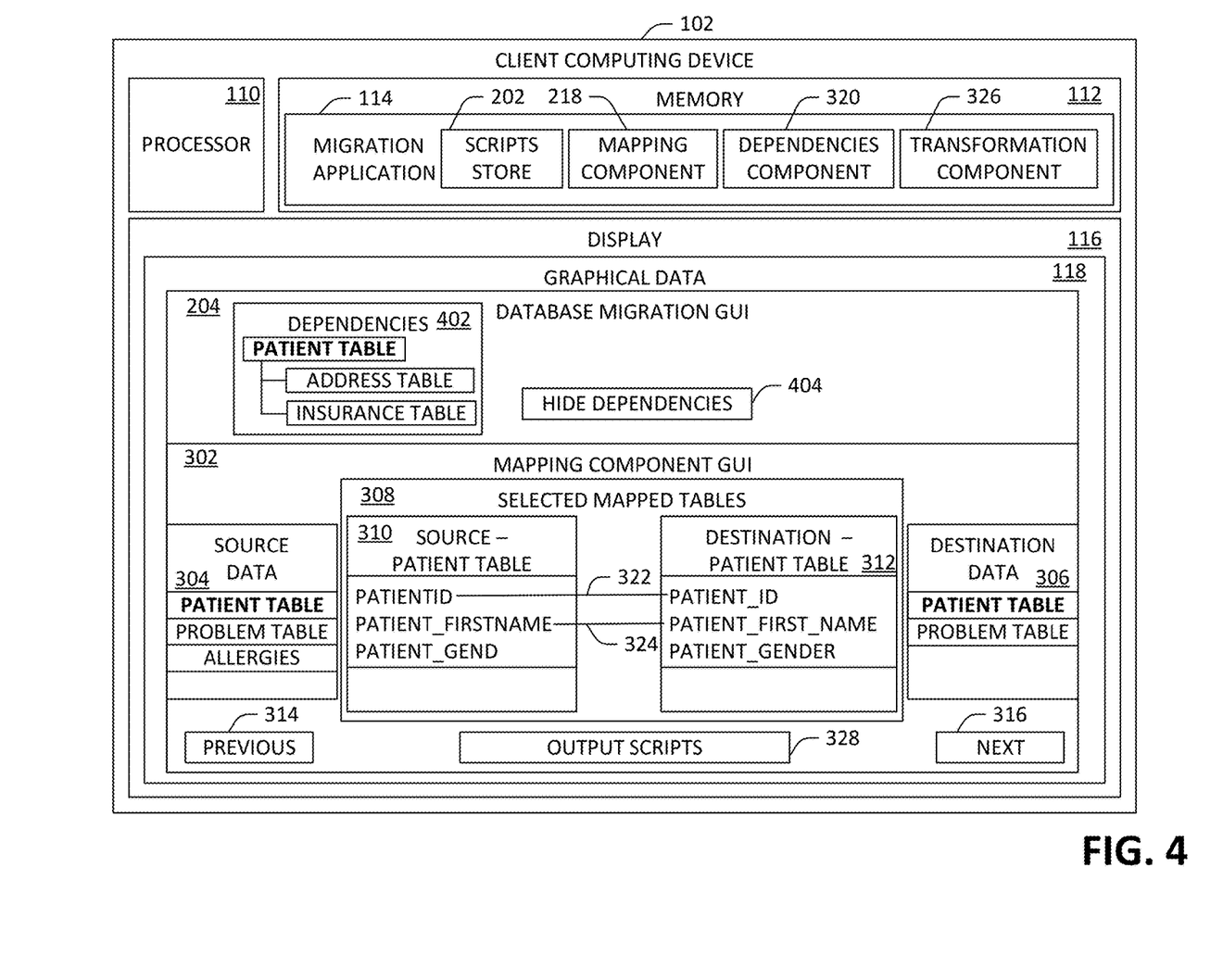
FIG. 4 depicts a database migration application GUI that comprises a dependencies pane.

With reference to FIG. 4, a depiction of a dependencies pane 402 is illustrated. The dependencies pane 402 comprises a diagram of the table represented in the source window 310 and tables that depend therefrom (as identified by the dependencies component 320). For example, dependent tables of the "PATIENT TABLE" table represented in the source window 310 include an "ADDRESS TABLE" table and an "INSURANCE TABLE" table. Accordingly, it can be ascertained that an "ADDRESS TABLE" table and an "INSURANCE TABLE" table exist in the source database 130. When the database migrator 104 selects, for example, the "ADDRESS TABLE" table from the dependencies pane 402, the selected mapped tables pane 308 is updated to include a representation of the "ADDRESS TABLE" table from the source database 130 and any tables from the destination database 132 that have been mapped to such "ADDRESS TABLE" table (by the mapping component 218 or manually by the database migrator 104), while the representations of the "PATIENT TABLE" tables depicted in the pane 308 are removed from the pane 308.

The database migration GUI 204 also includes a hide dependencies button 404. Selection of the hide dependencies button 404 by the database migrator 104 causes the dependencies pane 402 (and the hide dependences button 404) to be removed from the database migration GUI 204. Additionally, the show dependencies button 318 is returned to the database migration GUI 204.

Returning to FIG. 3, the selected mapped tables pane 308 comprises a first indicator 322 and a second indicator 324. The first indicator 322 and the second indicator 324 indicate that a field from the table represented in the source window 310 has been mapped to a field from the table represented in the destination window 312 (where the mapping has been determined by the mapping component 218 and/or manually by the database migrator 104). For example, in the illustration provided, the first indicator 322 indicates that the "PATIENTID" field of the "PATIENT TABLE" from the source database 130 has been mapped to the "PATIENT_ID" field of the "PATIENT TABLE" table of the destination database 132. Further in the illustration provided, the second indicator 324 indicates that the "PATIENT_FIRSTNAME" field of the "PATIENT TABLE" table from the source database 130 has been mapped to the "PATIENT_FIRST_NAME" field of the "PATIENT TABLE" table from the destination database 132. The absence of an indicator for a mapping of "PATIENT_GEND" field of the "PATIENT TABLE" table represented in the source window 310 to the "PATIENT_GENDER" field of the "PATIENT TABLE" table represented in the destination field 312 indicates that the mapping component 218 has failed to map those two tables.

Further, the mapping component GUI 302 allows the database migrator 104 to indicate (e.g., by way of a mouse pointer, voice command, interaction with a touch sensitive display, etc.) that entities represented in the selected mapped tables pane 308 should be mapped to one another (or should not be mapped to one another). Graphically, this can be depicted in the mapping component GUI 302 as adding an indicator between database elements or removing an indicator between database elements.

Figure 5:
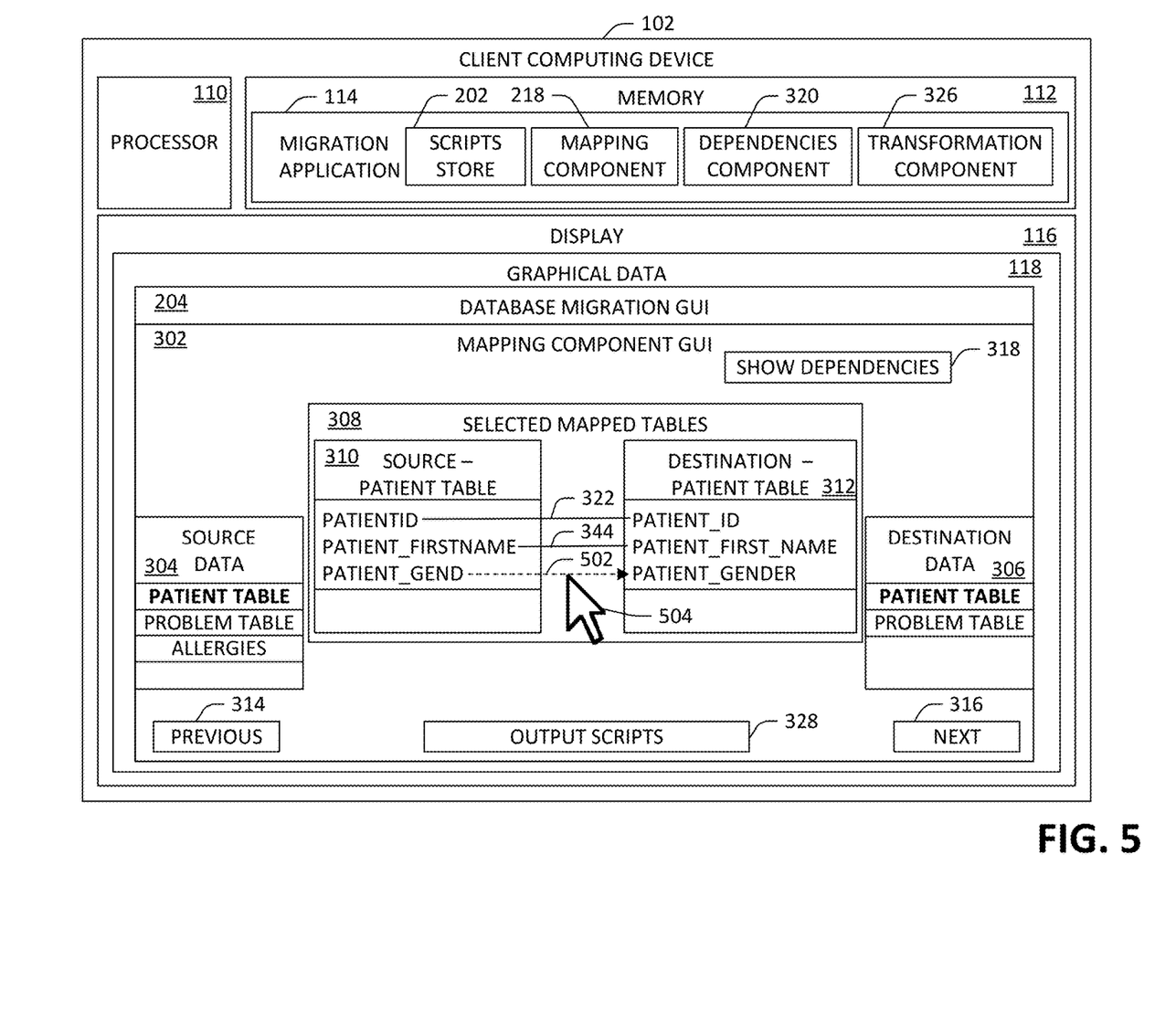
FIG. 5 depicts another exemplary database migration application GUI.

With reference to FIG. 5, a depiction of the database migrator 104 manually identifying a mapping between database elements is illustrated. In the example shown in FIG. 5, the database migrator 104 positions a cursor 502 at a starting point along a path 504 (approximately at the text "PATIENT_GEND" in the source window 310), and sets forth a selection command to indicate that the field "PATIENT_GEND" is to be selected in the source window 310. The database migrator 104 can then perform some action (e.g., drag the mouse cursor) that indicates that the "PATIENT_GEND" field represented in the source window 310 is to be mapped to the "PATIENT_GENDER" field represented in the destination window 312. In the example, the database migrator 104, can use a "click and drag" approach, depressing a mouse button when the cursor is over the "PATIENT_GEND" text, dragging the cursor until the cursor is over the "PATIENT_GENDER" text, and then releasing the mouse button. The mapping component 218 records this new mapping, and causes the selected mapped tables pane 308 to display the additional indicator 502 along the path 504, wherein the additional indicator indicates that the "PATIENT_GEND" field represented in the source window 310 is mapped to the "PATIENT_GENDER" field represented in the target window 312.

Figure 6:
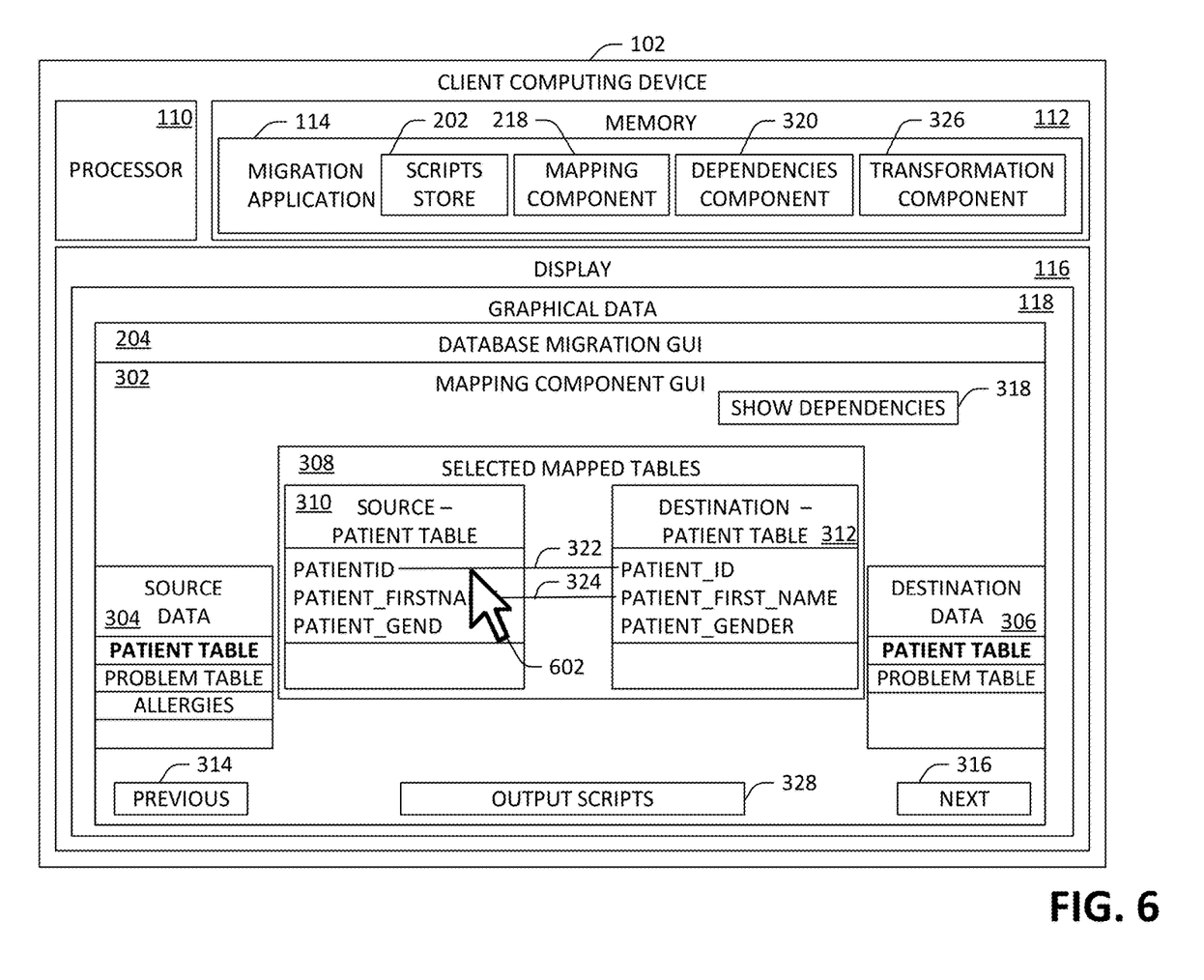
FIG. 6 illustrates yet another exemplary database migration application GUI.

Return to FIG. 3, the mapping component GUI 302 allows the database migrator 104 to indicate (e.g., by way of a mouse pointer, voice command, interaction with a touch sensitive display, etc.) that an indicator should be removed from the selected mapped tables pane 308, and thus a mapping identified by the mapping component 218 is to be deleted. For instance, the database migrator 104 may determine that the mapping component 218 has incorrectly generated the first indicator 322 (that indicates that the "PATIENTID" field represented in the source window 310 has been mapped to the "PATIENT_ID" field represented in the destination window 312). With reference to FIG. 6, a depiction of the database migrator 104 indicating that the first indicator 322 is to be removed is illustrated. In the example shown in FIG. 6, the database migrator 104 positions a cursor 602 on the first indicator 322, wherein the first indicator 322 indicates that the "PATIENTID" field is mapped to the "PATIENT_ID" field. The database migrator 104 can cause an indication (e.g., an extended mouse click for specified time) that the first indicator 322 is to be removed. Responsive to the indication of the database designer 104, the first indicator 322 can be removed, and the mapping component 218 can update the mappings such that the above-identified fields are not mapped to one another.

Returning to FIG. 3, the migration application 114 further comprises a transformation component 326. The transformation component 326, when executed by the processor 110, is configured to modify a mapping that is presented on the GUI, such that the modification allows, in the selected mapped tables GUI 308, source data in a field from the table represented in the source window 310 to be transformed into destination data in a field represented in the destination window 312. The transformation can be based upon one or more rules set forth by the database migrator 104, where database migrator 104 can set forth such rules via interaction with graphical elements in a transformation pane, described below.

Figure 7:
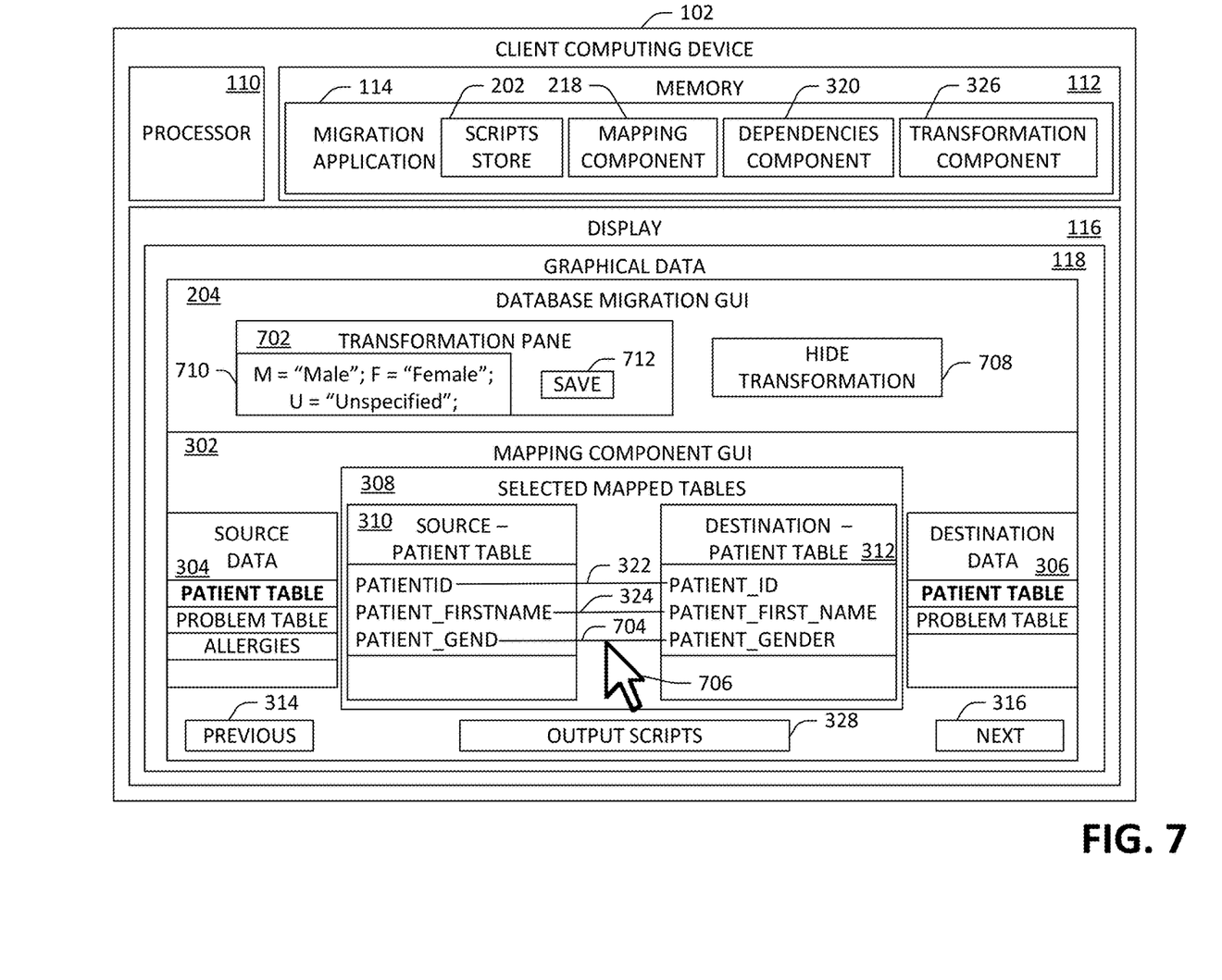
FIG. 7 depicts a database migration application GUI that comprises a transformation pane.

With reference to FIG. 7, a depiction of a transformation pane 702 in the database migration GUI 204 is illustrated. In this example, a third indicator 704 has been generated (by, e.g., the database migrator 104, a mapping algorithm, etc.). The third indicator 704 indicates that the "PATIENT_GEND" field represented in the source window 310 has been mapped to the "PATIENT_GENDER" field represented in the destination window 312. Further, the mapping component GUI 302 allows the database migrator 104 to indicate that data corresponding to the "PATIENT_GEND" field has a first structure, and needs to be transformed to have a second structure prior to being migrated to the "PATIENT_GENDER" field. For example, the database migrator 104 can double-click on the third indicator 704 via a mouse cursor 706 to indicate that a transformation is required when migrating data from the fields coupled by the indicator 704. Responsive to receiving this indication, the transformation pane 702 can be included in the database migration GUI 204, and a hide transformation button 708 can be displayed in the database migration GUI 204.

The transformation pane 702 comprises a transformation entry input field 710 and a save button 712. The transformation entry input field 710 comprises an input area where the database migrator 104 can specify how data in a field of a table from source database 130 is to be transformed when being migrated to a corresponding field in the destination database 132 (e.g., where the above-mentioned fields have been mapped to one another). For example, in in the illustration, the transformation entry input field 710 comprises rules set forth by the database migrator 104, wherein the rules are to be executed over data during migration. More particularly, in the illustration, the database migrator 104 has specified that "M" from the "PATIENT_GEND" field (of the source database 130) is to be transformed into "MALE" when being migrated to the "PATIENT_GENDER" field (of the destination database 132). The database migrator 104 has further indicated that "F" is to be transformed into "FEMALE", and that "U" is to be transformed into "UNSPECIFIED" When the database migrator 104 selects the save button 712, the rule or rules specified by the database migrator 104 in the field 710 are retained in the memory 112, such that the transformation rule is assigned to the mapping between the fields.

When the hide transformation button 708 is selected by the database migrator 104, the transformation pane 702 and the hide transformation button 708 are removed from the database migration GUI 204.

Returning again to FIG. 3, the database migration GUI 204 further comprises an output scripts button 328. The migration application 114, responsive to the output scripts button 328 being selected, causes scripts to be generated, wherein the scripts are based upon the mappings referenced above. More particularly, when the scripts are executed over the source database 130, data from the source database 130 is migrated to the destination database 132 in accordance with the mappings defined by the database migrator 104 by way of the database migration GUI 204. Further, the scripts may be stored in the scripts store 202.

Further, responsive to the database migrator 104 selecting the output scripts button 328, the migration application 114 can additionally generate an indication of the entities from either the source database 130 or destination database 132 that have no mappings in the database migration GUI 204. The indication can comprise a message in the graphical data 118 on the display 116. For these entities, the database migrator 104 can manually generate scripts or otherwise interact with the database migration GUI 204 to manually define mappings amongst and between such entities.

Figure 8:
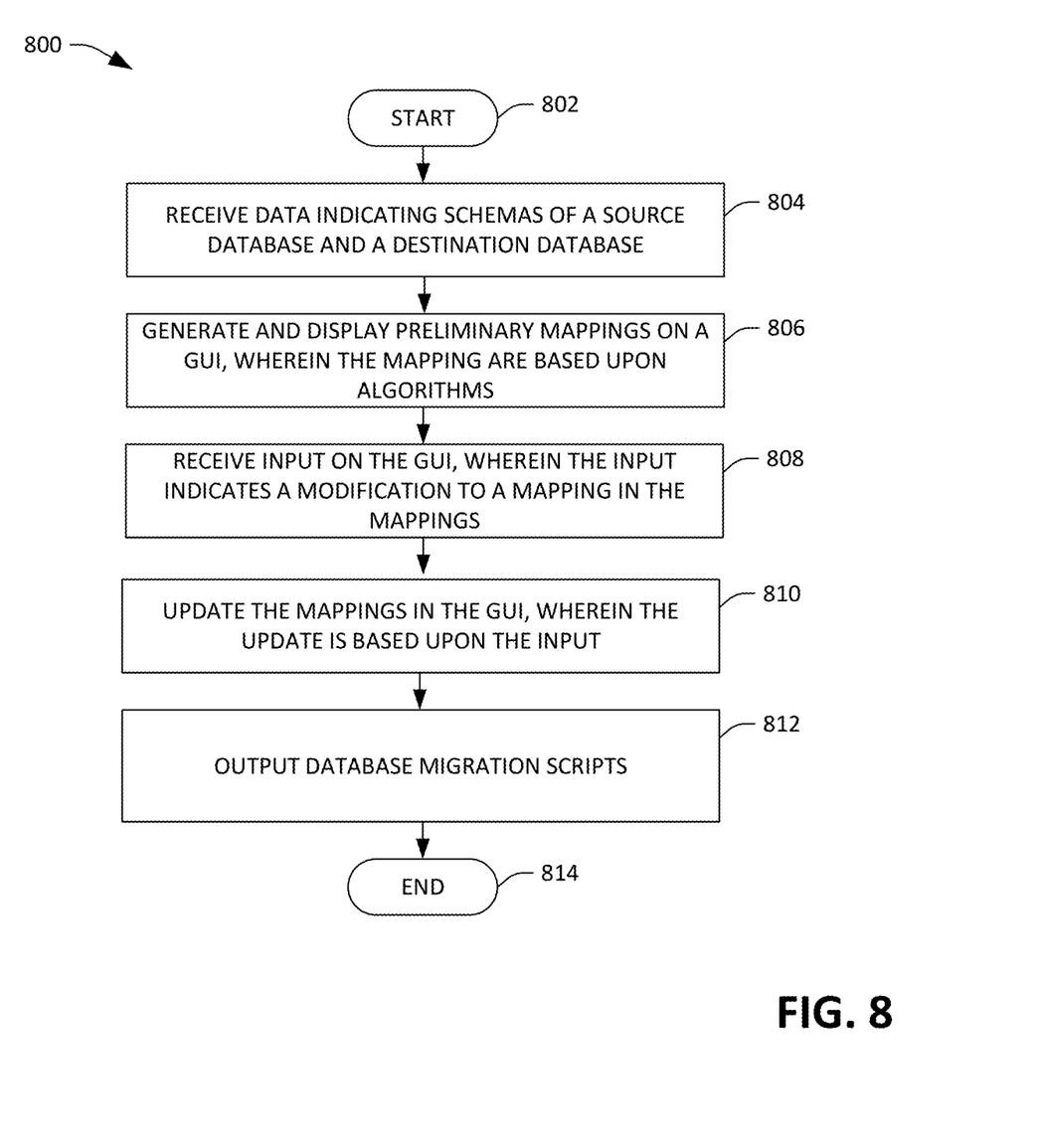
FIG. 8 is a flow diagram illustrating an exemplary methodology for generating scripts for database migration based upon input received by way of a graphical user interface.

FIG. 8 depicts an exemplary methodology pertaining to displaying a graphical user interface (GUI) that depicts mappings between entities of a source database and entities of a destination database. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

The methodology 800 is performed at a computing device that executes a data migration application, wherein the data migration application generates database migration scripts. The methodology 800 starts at 802, and at 804, the data migration application receives schemas of a source database and a destination database. At 806, in response to receiving the schemas of the source database and the destination database, the database migration application generates preliminary mappings between entities defined in the source database schema and the target database schema. Further, the database migration application causes the mappings to be displayed in a GUI.

At 808, the database migration application is configured to receive input indicating a modification to a mapping in the mappings. The modification can comprise an addition of a mapping to the mappings, removal of a mapping from the mappings, etc. At 810, in response to receiving the input, the database migration application is configured to update the mappings, presented in the GUI, based upon the modification. For example, if an additional mapping is indicated by the input, the database migration application presents the additional mapping on the GUI. At 812, responsive to receiving an indication to output database migration scripts, the database migration application is configured to output the database migration scripts, wherein the database migration scripts are generated based upon the mappings in the GUI. The scripts can be executed when data is migrated (e.g., transferred) from the source database to the destination database and cause data to be migrated based upon the scripts. The methodology 800 completes at 814.

Figure 9:
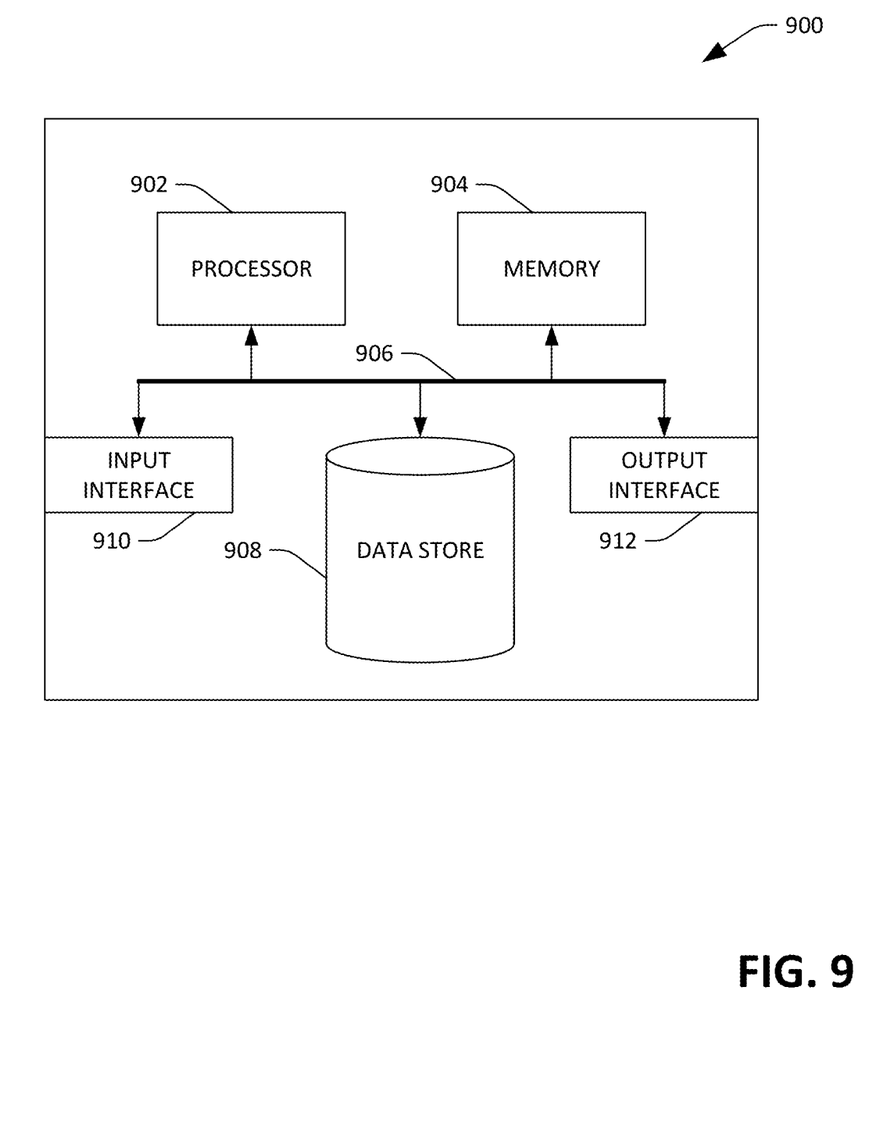
FIG. 9 is an exemplary computing device.

Referring now to FIG. 9, a high-level illustration of an exemplary computing device 900 that can be used in accordance with the systems and methodologies disclosed herein is illustrated. For instance, the computing device 900 may be used in a system that generates mappings between entities of a source database and a destination database, wherein the mappings can be modified based upon input to a graphical user interface (GUI). By way of another example, the computing device 900 can be used in a system that includes a database application that manages a database. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store scripts, where the scripts cause data to be migrated based upon parameters set forth in the scripts.

The computing device 900 additionally includes a data store 908 that is accessible by the processor 902 by way of the system bus 906. The data store 908 may include executable instructions, databases, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, GUIs, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device comprising:
    at least one processor; and
    memory that stores instructions that, when executed by the at least one processor, cause the at least one processor to perform acts comprising:
        generating a preliminary mapping between a first entity of a source database of a first application to a second entity of a target database of a second application, wherein the second application is an updated version of the first application, wherein the first entity is a first table in the source database, the first entity storing data that is maintained in the source database, wherein the preliminary mapping is generated based upon a first title of the first entity defined in a source database schema and a second title of the second entity defined in a target database schema, wherein generating the preliminary mapping comprises:
  removing at least one character from the first title to create a modified title; and
  comparing the modified title with the second title, wherein the preliminary mapping is generated based upon the modified title and the second title being identical to one another;
causing a graphical user interface (GUI) to be displayed on a display, wherein the GUI is configured to facilitate migrating data from the source database of the first application to the target database of the second application, wherein the GUI is displayed prior to the data from the source database being migrated to the target database, wherein the GUI depicts the preliminary mapping between the first entity and the second entity, the preliminary mapping visually connecting the first entity to the second entity in the GUI, and further wherein the GUI comprises a button, wherein when the button is selected, identities of tables that are dependent upon the first table in the source database are presented in the GUI;
receiving an indication that a database migrator has approved the preliminary mapping; and
responsive to receiving the indication, generating a script based upon the preliminary mapping, wherein the script, when executed by a processor, receives the source database as input and migrates the data stored in the first entity to the second entity of the target database such that a version of the data is stored in the second entity of the target database.

2. The computing device of claim 1, the acts further comprising:
  responsive to detecting the input to the GUI, altering the GUI, wherein the alteration is based upon the input.

3. The computing device of claim 1, wherein the second entity is a second table in the target database.

4. The computing device of claim 1, wherein the GUI comprises a selected mapped tables pane, wherein the selected mapped tables pane comprises an identifier for the first entity and an identifier for the second entity, and further wherein the selected mapped tables pane comprises a line connecting the identifier for the first entity with the identifier for the second entity, the line indicates that the first entity is mapped to the second entity.

5. The computing device of claim 1, wherein the title of the first entity and the title of the second entity are different from one another.

6. The computing device of claim 1, wherein the GUI comprises a selected mapped tables pane, wherein the second entity is a second table, and further wherein the selected mapped tables pane depicts:
  a first identifier for the first table;
  a second identifier for a field of the first table;
  a third identifier for the second table;
  a fourth identifier for a field of the second table; and
  graphical data between the second identifier and the fourth identifier that indicates that the field of the first table has been mapped to the field of the second table.

7. A method executed by a computing device that executes a database migration application, the method comprising:
  generating a preliminary mapping between a first entity of a source database of a first application to a second entity of a target database of a second application, wherein the second application is an updated version of the first application, wherein the first entity is a first table in the source database, the first entity storing data that is maintained in the source database, wherein the preliminary mapping is generated based upon a first title of the first entity defined in a source database schema and a second title of the second entity defined in a target database schema, wherein generating the preliminary mapping comprises:
    removing at least one character from the first title to create a modified title; and
    comparing the modified title with the second title, wherein the preliminary mapping is generated based upon the modified title and the second title being identical to one another;
  causing a graphical user interface (GUI) to be displayed on a display, wherein the GUI is configured to facilitate migrating data from the source database of the first application to the target database of the second application, wherein the GUI is displayed prior to the data from the source database being migrated to the target database, wherein the GUI depicts the preliminary mapping between the first entity and the second entity, the preliminary mapping visually connecting the first entity to the second entity in the GUI, and further wherein the GUI comprises a button, wherein when the button is selected, identities of tables that are dependent upon the first table in the source database are presented within the GUI;
  receiving an indication that a database migrator has approved the preliminary mapping; and
  responsive to receiving the indication, generating a script based upon the preliminary mapping, wherein the script, when executed by a processor, receives the source database as input and migrates the data stored in the first entity to the second entity of the target database such that a version of the data is stored in the second entity of the target database.

8. The method of claim 7, wherein the second entity is a second table in the target database.

9. The method of claim 7, wherein the preliminary mapping is generated based upon the first title and the second title being identical to one another.

10. The method of claim 7, wherein the identities of the tables are selectable, and further wherein when a first identity of a second table from the identities of the tables is selected, a second identity of a third table from the target database is presented in the GUI, and further wherein the GUI includes graphical data that indicates that the second table is mapped to the third table.

11. A computer-readable storage medium comprising instructions that, when executed by a processor, cause the processor to perform acts comprising:
  generating a preliminary mapping between a first entity of a source database of a first application to a second entity of a target database of a second application, wherein the second application is an updated version of the first application, wherein the first entity is a first table in the source database, the first entity storing data that is maintained in the source database, wherein the preliminary mapping is generated based upon a first title of the first entity defined in a source database schema and a second title of the second entity defined in a target database schema, wherein generating the preliminary mapping comprises:
    removing at least one character from the first title to create a modified title; and comparing the modified title with the second title, wherein the preliminary mapping is generated based upon the modified title and the second title being identical to one another;

causing a graphical user interface (GUI) to be displayed on a display, wherein the GUI is configured to facilitate migrating data from the source database of the first application to the target database of the second application, wherein the GUI is displayed prior to the data from the source database being migrated to the target database, wherein the GUI depicts the preliminary mapping between the first entity and the second entity, the preliminary mapping visually connecting the first entity to the second entity in the GUI, wherein the GUI comprises a button, wherein when the button is selected, identities of tables that are dependent upon the first table in the source database are presented within the GUI;

receiving an indication that a database migrator has approved the preliminary mapping; and responsive to receiving the indication, generating a script based upon the preliminary mapping, wherein the script, when executed by the processor, receives the source database as input and migrates the data stored in the first entity to the second entity such that a version of the data is stored in the second entity of the target database.

12. The computer-readable storage medium of claim 11, wherein the second entity is a second table in the target database.

13. The computer-readable storage medium of claim 11, wherein the preliminary mapping is generated based upon the first title and the second title being identical to one another.

14. The computer-readable storage medium of claim 11, wherein the identities of the tables are selectable, and further wherein when a first identity of a second table from the identities of the tables is selected, a second identity of a third table from the target database is presented in the GUI, and further wherein the GUI includes graphical data that indicates that the second table is mapped to the third table.

15. The computing device of claim 1, wherein the identities of the tables are selectable, and further wherein when a first identity of a second table from the identities of the tables is selected, a second identity of a third table from the target database is presented in the GUI, and further wherein the GUI includes graphical data that indicates that the second table is mapped to the third table.

16. The method of claim 7, further comprising:
responsive to detecting the input to the GUI, altering the GUI, wherein the alteration is based upon the input.

17. The method of claim 7, wherein the GUI comprises a selected mapped tables pane, wherein the second entity is a second table, and further wherein the selected mapped tables pane depicts:
a first identifier for the first table;
a second identifier for a field of the first table;
a third identifier for the second table;
a fourth identifier for a field of the second table; and
graphical data between the second identifier and the fourth identifier that indicates that the field of the first table has been mapped to the field of the second table.

18. The method of claim 7, wherein the title of the first entity and the title of the second entity are different from one another.

19. The computer-readable storage medium of claim 11, the acts further comprising:
responsive to detecting the input to the GUI, altering the GUI, wherein the alteration is based upon the input.

20. The computer-readable storage medium of claim 11, wherein the title of the first entity and the title of the second entity are different from one another.

* * * * *